(12) United States Patent
Kurita

(10) Patent No.: US 11,461,996 B2
(45) Date of Patent: Oct. 4, 2022

(54) METHOD, APPARATUS AND SYSTEM FOR DETERMINING FEATURE DATA OF IMAGE DATA, AND STORAGE MEDIUM

(71) Applicant: OMRON Corporation, Kyoto (JP)

(72) Inventor: Masashi Kurita, Kizugawa (JP)

(73) Assignee: OMRON Corporation, Kyoto (JP)

( * ) Notice: Subject to any disclaimer, the term of this patent is extended or adjusted under 35 U.S.C. 154(b) by 138 days.

(21) Appl. No.: 16/968,612

(22) PCT Filed: Mar. 5, 2018

(86) PCT No.: PCT/IB2018/051390
§ 371 (c)(1),
(2) Date: Aug. 10, 2020

(87) PCT Pub. No.: WO2019/171118
PCT Pub. Date: Sep. 12, 2019

(65) Prior Publication Data
US 2021/0049398 A1    Feb. 18, 2021

(51) Int. Cl.
*G06V 10/44* (2022.01)
*G06K 9/62* (2022.01)
*G06V 10/46* (2022.01)

(52) U.S. Cl.
CPC .......... *G06V 10/443* (2022.01); *G06K 9/627* (2013.01); *G06K 9/629* (2013.01); *G06V 10/462* (2022.01)

(58) Field of Classification Search
CPC .... G06V 10/443; G06V 10/462; G06V 10/40; G06V 10/451; G06V 10/82; G06K 9/627; G06K 9/629
See application file for complete search history.

(56) References Cited

U.S. PATENT DOCUMENTS 10,229,346 B1 * 3/2019 Kim ..................... G06N 3/0454
10,997,752 B1 * 5/2021 Yoo ......................... G06T 11/00
(Continued)

FOREIGN PATENT DOCUMENTS

| JP | 2002140714 | 5/2002 |
| JP | 2005115525 | 4/2005 |
| JP | 2009169518 | 7/2009 |

OTHER PUBLICATIONS

Kazuma Takahashi et al., "Accuracy improvement of food photo attractiveness estimation based on consideration of image features," with English abstract, IEICE Technical Report of the Institute of Electronics, Information And Communication Engineers, Oct. 2016, pp. 41-46.

(Continued)

*Primary Examiner* — Aaron W Carter
(74) *Attorney, Agent, or Firm* — JCIPRNET

(57) ABSTRACT

Provided in the present disclosure are a method, an apparatus and a system for determining feature data of image data, and a storage medium. Wherein, the method comprises: acquiring features of image data, the features comprising a first feature and a second feature, wherein, the first feature is extracted from the image data using a first model, the first model being trained in a machine learning manner, and the second feature is extracted from the image data using a second model, the second model being constructed based on a pre-configured data processing algorithm; and determining feature data based on the first feature and the second feature. The present disclosure solves the technical problem that features recognized by the AI may not be consistent with human recognized features.

11 Claims, 5 Drawing Sheets

(56) References Cited

U.S. PATENT DOCUMENTS

| | | | |
|---|---|---|---|
| 2011/0222742 A1* | 9/2011 | Stein | G06V 40/16 |
| | | | 382/167 |
| 2012/0033073 A1* | 2/2012 | Jo | G06V 20/52 |
| | | | 382/199 |
| 2017/0193655 A1 | 7/2017 | Madabhushi et al. | |
| 2018/0032801 A1 | 2/2018 | Gur et al. | |
| 2018/0225820 A1* | 8/2018 | Liang | G16H 50/20 |
| 2018/0293721 A1* | 10/2018 | Gupta | G01N 21/8851 |
| 2020/0242402 A1* | 7/2020 | Jung | G06V 20/30 |
| 2021/0049398 A1* | 2/2021 | Kurita | G06V 10/451 |
| 2021/0150534 A1* | 5/2021 | Yu | G06K 9/6292 |
| 2021/0319195 A1* | 10/2021 | Chakravarty | G06K 7/1417 |

OTHER PUBLICATIONS

Rui Fukui et al., "Numerical modeling of image discriminability for home storage and organization system on a smart device," with English abstract, The 27th annual conference of the Japanese society for artificial intelligence, 2013, pp. 1-4.

"Office Action of Japan Counterpart Application" with English translation thereof, dated Nov. 30, 2021, p. 1-p. 8.

"International Search Report (Form PCT/ISA/210) of PCT/IB2018/051390", dated Oct. 29, 2018, pp. 1-4.

"Written Opinion of the International Searching Authority (Form PCT/ISA/237) of PCT/B2018/051390", dated Oct. 29, 2018, pp. 1-8.

Shaoyan Sun et al.,"Scalable Object Retrieval with Compact Image Representation from Generic Object Regions", ACM Trans Multimedia Comput. Commun. Appl., Oct. 20, 2015, pp. 1-21.

\* cited by examiner

METHOD, APPARATUS AND SYSTEM FOR DETERMINING FEATURE DATA OF IMAGE DATA, AND STORAGE MEDIUM

CROSS-REFERENCE TO RELATED APPLICATION

This application is a 371 application of the international PCT application serial no. PCT/IB2018/051390, filed on Mar. 5, 2018. The entirety of the above—mentioned patent application is hereby incorporated by reference herein and made a part of this specification.

TECHNICAL FIELD

The present disclosure relates to the field of image recognition, and in particular, to a method, an apparatus, a system and a program for determining feature data of image data, and a storage medium.

BACKGROUND

Currently, various methods can be used for image recognition, and one of them is a method using AI. At present, artificial intelligence (AI) technology is widely used in various fields comprising image recognition. Among them, artificial intelligence technology is applied to image recognition, so as to replace human beings to process a large amount of image information. For people, image stimulation affects sensory organs. In image recognition, people need not only the information that enters the senses but also the information stored in the memories. Only through the process of comparing the current information with the stored information, the image recognition can be implemented. Artificial intelligence technology can output on the basis of human recognition ability, and process, analyze and understand images so as to recognize various targets and objects of different modes. Artificial intelligence technology can replace human beings to automatically process a large amount of image information, to solve the problem of human physiological shortcomings in terms of recognition, thereby partially replacing human brain to work. Moreover, AI can extract, from image data, features people are not aware of or cannot physiologically recognize.

However, in the case of using AI for image recognition, AI recognized features may not be consistent with human recognized features. Therefore, in the case of using AI for determining features of an image, the output may sometimes be ambiguous to human beings.

With respect to the above-mentioned problem, no effective solution has been proposed yet.

SUMMARY

Provided in the embodiments of the present disclosure are a method, an apparatus, a system and a program for determining feature data of image data, and a storage medium, so as to at least solve the technical problem that AI recognized features may not be consistent with human recognized features.

According to an aspect of the embodiments of the present disclosure, there is provided a method for determining feature data of image data, comprising: acquiring features of image data, the features comprising a first feature and a second feature, wherein, the first feature is extracted from the image data using a first model, the first model being trained in a machine learning manner, and the second feature is extracted from the image data using a second model, the second model being constructed based on a pre-configured data processing algorithm; and determining feature data based on the first feature and the second feature.

In this way, by acquiring the features in the image data by means of a trained artificial intelligence machine and a computer storing a conventional image feature extraction algorithm, respectively, and comparing the differences between the features extracted by these different manners, the training effect of the artificial intelligence machine can be learned.

Further, in the method, the acquiring features of image data comprises one of: extracting the first feature from the image data, and extracting the second feature from the feature region where the first feature of the image data is located; extracting the second feature from the image data, and extracting the first feature from the feature region where the second feature of the image data is located; and extracting the first feature and the second feature for the entirety of the image data.

In this way, the user can freely choose from which region to extract the second feature based on the demand for recognition accuracy.

By extracting the first feature and the second feature in series or in parallel, the features determined for example by the AI-based image recognition may be more consistent with human recognized features.

Further, in the method, the determining feature data based on the first feature and the second feature comprises: based on the comparison result of the first feature and the second feature, assigning the first feature or the second feature with a label, as the feature data.

By assigning the first feature or the second feature with a label, it may help to more clearly show whether the features determined based on different approaches are the same.

Further, in the method, the determining feature data based on the first feature and the second feature comprises: if the first feature is different from the second feature, assigning the first feature and the second feature with a first label and a second label respectively, as first feature data and second feature data respectively; and if the first feature is the same as the second feature, assigning the first feature or the second feature with a third label, as third feature data.

By assigning different labels based on the comparison result of the first feature or the second feature, it may help to more clearly show whether the features determined based on different approaches are the same, and to output the feature data based on the comparison result.

Further, in the method, the feature data characterizes a color feature, a texture feature, a shape feature, or a spatial relationship feature of the image data.

By combining AI-based and traditional image recognition technologies, the feature data characterizing the color, texture, shape, or spatial relationship feature of the image data can be determined more efficiently and quickly.

According to another aspect of the embodiments of the present disclosure, there is further provided an apparatus for determining feature data of image data, comprising: an acquisition section for acquiring features of image data, the features comprising a first feature and a second feature, wherein, the first feature is extracted from the image data using a first model, the first model being trained in a machine learning manner, and the second feature is extracted from the image data using a second model, the second model being constructed based on a pre-configured data processing algorithm; and a determination section for determining feature data based on the first feature and the second feature.

Further, in the apparatus, the acquisition section acquires the features of the image data by one of: extracting the first feature from the image data, and extracting the second feature from the feature region where the first feature of the image data is located; extracting the second feature from the image data, and extracting the first feature from the feature region where the second feature of the image data is located; and extracting the first feature and the second feature for the entirety of the image data.

Further, in the apparatus, the determination section assigns the first feature or the second feature with a label, as the feature data, based on the comparison result of the first feature and the second feature.

Further, in the apparatus, if the first feature is different from the second feature, the determination section assigns the first feature and the second feature with a first label and a second label respectively, as first feature data and second feature data respectively; and if the first feature is the same as the second feature, the determination section assigns the first feature or the second feature with a third label, as third feature data.

Further, in the apparatus, the feature data characterizes a color feature, a texture feature, a shape feature, or a spatial relationship feature of the image data.

According to another aspect of the embodiments of the present disclosure, there is further provided a system for determining feature data of image data, comprising: a processing unit for executing the above-mentioned method; and an output unit for outputting the feature data.

According to another aspect of the embodiments of the present disclosure, there is further provided a program for determining feature data of image data, which program, when executed, executes the above-mentioned method.

According to another aspect of the embodiments of the present disclosure, there is further provided a storage medium having a program stored thereon, which program, when executed, executes the above-mentioned method.

In the embodiments of the present disclosure, an illustrative purpose is solving the technical problem that AI recognized features may not be consistent with human recognized features.

BRIEF DESCRIPTION OF THE DRAWINGS

The drawings described herein are used to provide a further understanding of the disclosure and constitute a part of the present application. The schematic embodiments of the disclosure and the descriptions thereof are used to explain the disclosure, and do not constitute improper limitations to the disclosure. In the drawings.

DETAILED DESCRIPTION OF THE EMBODIMENTS

Figure 1:
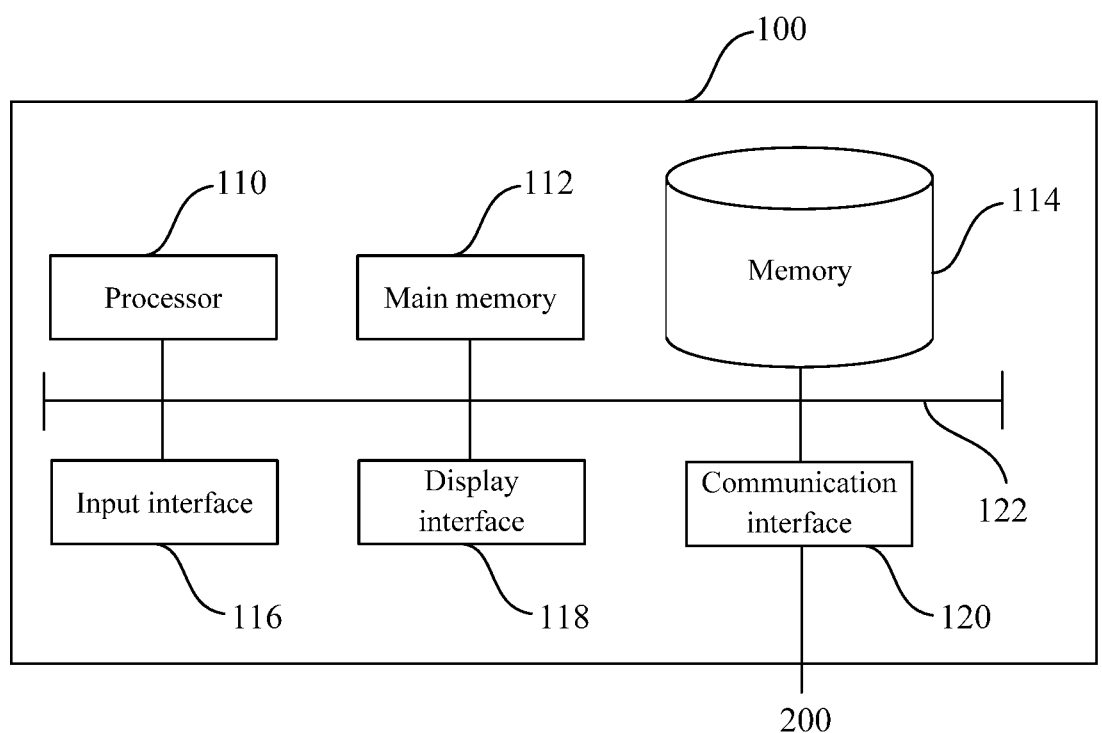
FIG. 1 is a hardware structure of a system for determining feature data of image data according to an implementation mode of the present disclosure.

In sequence to make those skilled in the art better understand the solutions of the present disclosure, the technical solutions in the embodiments of the present disclosure are clearly and completely described below with reference to the accompanying drawings in the embodiments of the present disclosure. Apparently, the described embodiments are merely a part of the embodiments of the present disclosure, rather than all of the embodiments. All other embodiments obtained by those of ordinary skill in the art based on the embodiments in the present disclosure, without creative efforts, shall fall within the protection scope of the present disclosure.

It should be noted that the terms "first", "second" and the like in the description and claims of the present disclosure and the foregoing drawings are used to distinguish similar objects, and are not necessarily used to describe a specific sequence or a chronological sequence. It is to be understood that the data so used may be interchangeable where appropriate so that the embodiments of the present disclosure described herein can be implemented in a sequence other than those illustrated or described herein. Furthermore, the terms "comprise" and "have" and any variations thereof are intended to cover a non-exclusive inclusion, e.g., a process, method, system, product, or device that comprises a list of steps or units is not necessarily limited to the listed steps or units, but may comprise other steps or units not expressly listed or inherent to these processes, methods, products or devices.

According to an embodiment of the present disclosure, there is provided a method for determining feature data of image data. It should be noted that the steps shown in the flowchart of the accompanying drawings may be executed in a computer system such as a set of computer-executable instructions, and although the logical sequence is shown in the flowchart, in some cases, the illustrated or described steps may be performed in a sequence different from that herein.

In one embodiment of a method for determining feature data of image data of the present disclosure, features of the image data are extracted in various approaches, e.g., by acquiring features of the image data by means of a trained artificial intelligence machine and a computer which stores a conventional image feature extraction algorithm, respectively. By comparing the differences of the features extracted by these various approaches, the training effects of the artificial intelligence machine can be known, improving the training process pertinently, whilst improving the accuracy of extracting the features in a single approach. The features of the image data extracted in various approaches may be classified according to a predetermined rule. For example, different types of features may be assigned with different labels so that the classified feature data may be used for purposes such as image analysis and statistics, the training of the artificial intelligence machine and the like. In addition, it should be noted that the image here is not limited to a so-called two-dimensional image, that is, it comprises a three-dimensional image including distance information, thermography, or the like.

At first, a hardware structure of a system 100 for determining feature data of image data according to an implementation mode of the present disclosure is described.

FIG. 1 is a mode diagram of a hardware structure of a system 100 for determining feature data of image data according to an implementation mode of the present disclosure. As shown in FIG. 1, for example, the system 100 for determining feature data of image data may be implemented by a general computer of a general computer architecture. The system 100 for determining feature data of image data may include a processor 110, a main memory 112, a memory 114, an input interface 116, a display interface 118 and a communication interface 120. These parts may, for example, communicate with one another through an internal bus 122.

The processor 110 extends a program stored in the memory 114 on the main memory 112 for execution, thereby realizing functions and processing described hereinafter. The main memory 112 may be structured to be a nonvolatile memory, and plays a role as a working memory required by program execution of the processor 110.

The input interface 116 may be connected with an input unit such as a mouse and a keyboard, and receives an instruction input by operating the input portion by an operator.

The display interface 118 may be connected with a display, and may output various processing results generated by program execution of the processor 110 to the display.

The communication interface 120 is configured to communicate with a Programmable Logic Controller (PLC), a database device and the like through a network 200.

The memory 114 may store a program capable of determining a computer as the system 100 for determining feature data of image data to realize functions, for example, program for determining feature data of image data and an Operating System (OS).

The program for determining feature data of image data stored in the memory 114 may be installed in the identification system 100 through an optical recording medium such as a Digital Versatile Disc (DVD) or a semiconductor recording medium such as a Universal Serial Bus (USB) memory. Or, the program for determining feature data of image data may also be downloaded from a server device and the like on the network.

The program for determining feature data of image data according to the implementation mode may also be provided in a manner of combination with another program. Under such a condition, the program for determining feature data of image data does not include a module included in the other program of such a combination, but cooperates with the other program for processing. Therefore, the program for determining feature data of image data according to the implementation mode may also be in a form of combination with the other program.

Figure 2:
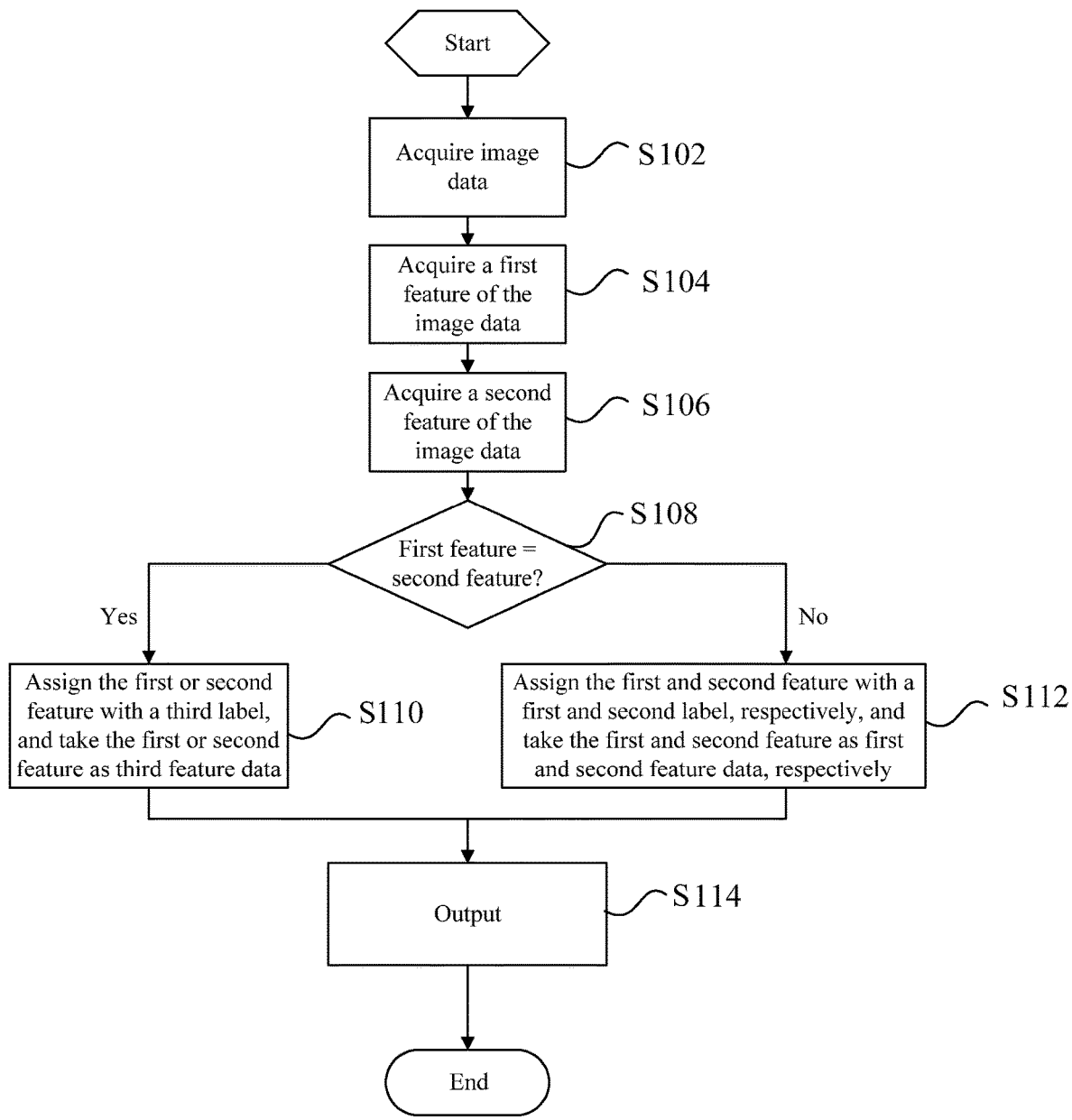
FIG. 2 is a schematic diagram of an optional method for determining feature data of image data according to a first embodiment of the present disclosure.

FIG. 2 is a schematic diagram of an optional method for determining feature data of image data according to a first embodiment of the present disclosure. As shown in FIG. 2, the method comprises the following steps.

In step S102, image data is acquired. For example, image data captured in real time by a camera or the like is acquired. In addition, image data may also be received, for example, the image data is transmitted via the network. In some cases, multiple pictures need to be collected or transmitted in advance so as to collect a large amount of image data for later recognition and analysis.

In step S104, a first feature of the image data is acquired. Specifically, the first feature is acquired from the image data obtained in step S102 through a first model, the first model comprising an artificial intelligence-based model such as an artificial neural network model trained in a machine learning manner. Usually, the construction and use of the artificial neural network model comprise two associated phases, that is, learning phase and implementation phase. The former is to select the features of samples and find a classification rule. The latter is to classify and recognize an unknown sample set according to the classification rule.

In the image recognition process, the image recognition mechanism must exclude redundant inputted information, and extract key information. The first feature may be a color feature, a texture feature, a shape feature, or a spatial relationship feature of the image data. Among them, the color feature is a global feature that describes the surface properties of a scene corresponding to an image or image region. A general color feature is a pixel point-based feature, to which all pixels belonging to the image or image region have their own contribution. A texture feature is also a global feature that also describes the surface properties of the scene that correspond to the image or image region. A spatial relationship feature refers to the mutual spatial position or relative direction relationship among multiple objects segmented from the image, and the relationships can also be divided into connection/adjacency relationship, overlap/superposing relationship, and inclusion/receiving relationship. Generally, spatial position information can be divided into two categories: relative spatial position information and absolute spatial position information.

In step S106, a second feature of the image data is acquired. Specifically, the second feature is acquired from the image data obtained in step S102 though a second model, the second model being constructed based on a pre-configured data processing algorithm such as an algorithm for edge detection, like a zero-crossing based algorithm. Similar to the first feature, the second feature may be a shape feature, an edge feature, a gray feature, a color feature, a texture feature, a spatial relationship feature, or the like of the image data. Among them, the edge detection is used to detect the part where the local image luminance changes most significantly, and it is the most fundamental operation for the detection of a significant local image change. In addition, the gray feature is a local feature rather than a global feature, and may be a feature represented by difference of grey values of each pixel. Thus, the edge feature may be regarded as an example of the gray feature.

The image data acquired in step S102 may be enhanced before the first feature of the image data is acquired in step S104 or the second feature is acquired in step S106. For example, in order to more facilitate image data extraction and recognition, it is possible to remove some unnecessary or disturbing information by pre-processing the image data. For example, the image data acquired in step S102 may be enhanced by a spatial domain enhancement processing and a frequency domain image enhancement processing.

In step S108, the first feature acquired in step S104 is compared with the second feature acquired in step S106 to determine whether they are the same. It should be noted that "the same" herein comprises not only the completely same case, but also the cases where the difference between the two is less than a predetermined threshold. The threshold or threshold range for performing the above-mentioned comparison may be selected according to the features of the image data characterized by the first feature and the second feature. For example, in a case where the first feature and the second feature characterize the shape features of the image data, a first threshold may be selected, and in a case where the difference between the first feature and the second feature is less than or equal to the first threshold, it is determined that the first feature acquired in S104 and the second feature acquired in step S106 are the same. For example, in a case where the first feature and the second feature characterize the gray features of the image data, a second threshold may be selected, and in a case where the difference between the first feature and the second feature is less than or equal to the second threshold, it is determined that the first feature acquired in step S104 and the second feature acquired in step S106 are the same. Further, in a case where the mathematical forms of the first feature and the second feature are different, a normalization processing may be performed to convert the first feature and the second feature into the same form for further comparison.

In a case where it is determined in step S108 that the first feature and the second feature are different, the procedure advances to step S112, in which the first feature and the second feature are assigned with a first label and a second label respectively, and the first feature and the second feature are taken as first feature data and second feature data, respectively; next, the procedure advances to step S114, in which the first label and the second label are outputted and the first feature data and/or the second feature data are outputted as the feature data, and the procedure thus ends.

In a case where it is determined in step S108 that the first feature and the second feature are the same, the procedure advances to step S110, in which the first feature or the second feature is assigned with a third label, and the first feature or the second feature is taken as third feature data; next, the procedure advances to step S114, in which the third label is outputted and the third feature data is outputted as the feature data, and the procedure thus ends.

Here, for example, the labels assigned to the first feature and the second feature may take one of the following values: 0, 1, 2. In a case where the first feature is assigned with label 0 and the second feature is assigned with label 1, it indicates that the first feature and the second feature are different. In a case where the first feature or the second feature is assigned with label 2, it indicates that the first feature and the second feature are the same. Therefore, by assigning the labels with the values 0, 1, 2, it is possible to determine that the first feature obtained through the first model and the second feature obtained through the second model have the same probability, thereby further improving the accuracy of recognition.

In addition, the first feature acquired in step S104 and the second feature acquired in step S106 may be processed, for example, classified, according to a predetermined rule. For example, according to a statistical model, it is possible to determine whether the acquired features satisfy a certain distribution rule. Specifically, the features obtained in the feature extraction phase are defined to be in a feature space which contains all the features. A different feature or a different type of object corresponds to a point in the space. In the classification phase, the principle of statistical decision is used to divide the feature space so as to achieve the purpose of recognizing objects with different features. The basic principle of the statistical mode recognition is that samples with similarities approach to each other in the mode space and form a "group." The analysis method thereof is to classify a given mode into C categories according to the measured feature vector $X_i=(x_{i1}, x_{i2}, \ldots, x_{id})^T$ ($i=1, 2, \ldots, N$), and to determine the classification according to a function of distance between modes. Where, T represents transposition; N is the number of sample points; and d is the number of sample features. Next, different categories of features may be assigned with different labels, so that the classified feature data can be used for image analysis and statistics, the training of an artificial intelligence machine and the like.

Through the above-mentioned steps, by combining the AI determination method and the determination method of the determination result of the conventional image recognition algorithm, an illustrative purpose of improving the determination result as an output is achieved, thereby achieving the technical effect that AI recognized features are more consistent with human recognized features.

The reason that the determination result of the conventional image recognition algorithm such as edge detection algorithm are similar with the result recognized by human eyes is in that the shape feature, the edge feature, the gray feature, and the color feature etc. calculated by these conventional image recognition algorithm are similar with the features recognized by human eyes.

Wherein, the AI determination method can be used for face detection, product appearance inspection, defect inspection, spam detection and the like. For example, the method may be applied to components that are provided on a mobile phone, a smart phone, or other similar mobile device to determine feature data. When the components that determine feature data are used for the recognition of a moving object in the case of a driving vehicle, the mobile device is a device capable of being attached to the vehicle so as to acquire a moving body (for example, a pedestrian, an animal, a vehicle) appearing in the vicinity (for example, front) of the vehicle or a stationary object (for example, a stationary obstacle, a signpost, traffic lights).

In addition, when it is determined that the feature recognized by the AI is not consistent with the feature recognized by human, it can be determined with respect to what feature(s) of the object in the image the determination method has low recognition accuracy, so that the AI system can be subsequently trained. For example, an image with a specific feature can be added as training data to enable the AI system to perform enhanced training on the specific feature so as to improve the recognition accuracy of the specific feature.

It should be noted that, alternatively, in this method, the sequence of step S104 and step S106 may be reversed, or step S104 and step S106 may be performed simultaneously. In addition, the above-mentioned processing may be ended at step S108 as needed, omitting steps S110, S112, S114. Moreover, as necessary, only the branch operation, which is performed in a case where it is determined in step S108 that the first feature and the second feature are the same, may be performed, that is, step S112 is omitted. Wherein, the feature data outputted in step S114 characterizes a color feature, texture feature, shape feature, or spatial relationship (e.g., adjacency, connectivity, region and boundary, distance metric) feature of the image data acquired in step S102. The color feature, texture feature, shape feature or spatial relationship feature of the image data acquired by the above-mentioned method can be used for damage inspection and disease diagnosis. For example, an endoscopic image is recognized by the above-mentioned method, so that the outputted feature data can be used to detect whether the tested subject has a cancerous condition.

Figure 3:
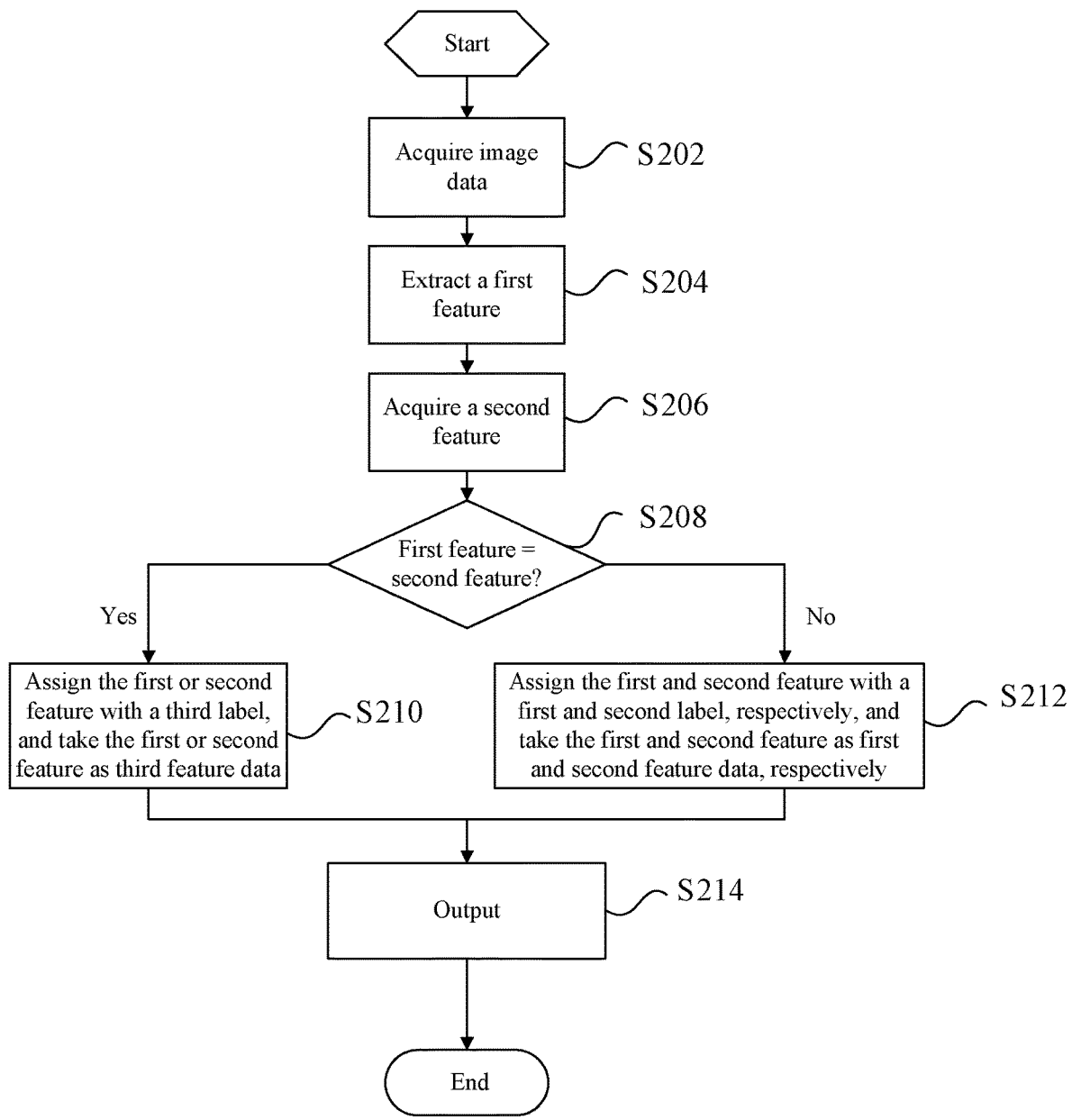
FIG. 3 is a schematic diagram of an optional method for determining feature data of image data according to a second embodiment of the present disclosure.

FIG. 3 is a schematic diagram of an optional method for determining feature data of image data according to a second embodiment of the present disclosure. Parts different from the first embodiment are steps S204 and S206, and only the different parts are described below.

In step S204, the first feature of the image data is extracted. Specifically, the first feature is extracted from the image data obtained in step S202 through the first model, and the first model is trained in a machine learning manner, for example, it is an artificial intelligence-based model.

In step S206, the second feature is extracted. Specifically, the second feature is extracted from the feature region where the first feature extracted in step S204 is located through the second model, wherein, the second model is constructed based on a pre-configured data processing algorithm, for example, it is an edge detection-based model.

In the second embodiment according to the present disclosure, it is particularly useful for the case where it is only necessary to extract the first feature and the second feature when they are the same.

It should be noted that, alternatively, in the method, the above-mentioned processing may be ended at step S208 as needed, omitting steps S210, S212 and S214. Moreover, if necessary, only the branch operation, which is performed in a case where it is determined in step S208 that the first feature and the second feature are the same, may be performed, that is, step S212 is omitted. Wherein, the feature data outputted in step S214 characterizes a color feature, texture feature, shape feature, or spatial relationship feature of the image data acquired in step S202. The color feature, texture feature, shape feature or spatial relationship feature of the image data acquired by the above-mentioned method can be used for damage inspection and disease diagnosis. For example, an endoscopic image is recognized by the above-mentioned method, so that the outputted feature data can be used to detect whether the tested subject has a cancerous condition.

Figure 4:
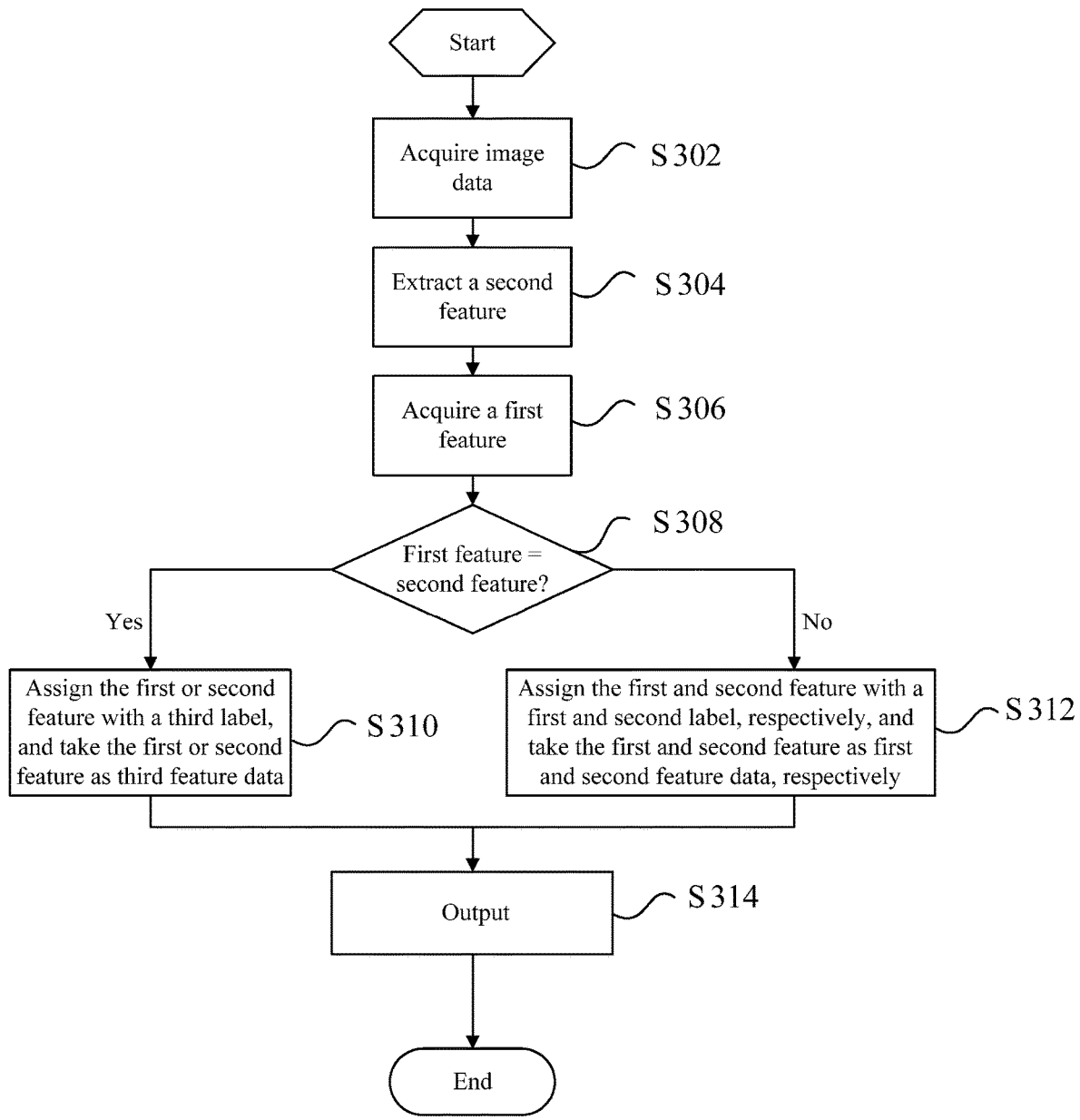
FIG. 4 is a schematic diagram of an optional method for determining feature data of image data according to a third embodiment of the present disclosure.

FIG. 4 is a schematic diagram of an optional method for determining feature data of image data according to a third embodiment of the present disclosure. Parts different from the first embodiment are steps S304 and S306, and only different parts are described below.

In step S304, the second feature of the image data is extracted. Specifically, the second feature is extracted from the image data obtained in step S202 through the second model, wherein, the second model is constructed based on a pre-configured data processing algorithm, for example, it is an edge detection-based model.

In step S306, the first feature is extracted. Specifically, the first feature is extracted from the feature region where the second feature extracted in step S304 is located through the first model, and the first model is trained in a machine learning manner, for example, it is an artificial intelligence-based model.

It should be noted that, alternatively, in the method, the above-mentioned processing may be ended at step S308, omitting steps S310, S312 and S314 as needed. In addition, only the branch operation, which is performed in a case where it is determined in step S308 that the first feature and the second feature are the same, may be performed, that is, step S312 is omitted. Wherein, the feature data outputted in step S314 characterizes a color feature, texture feature, shape feature, or spatial relationship feature of the image data acquired in step S302.

A series of processing described above can be executed by hardware or by software. In a case where a series of processes is executed by software, it is preferable to have a configuration serving as a computer capable of executing the software. Examples of the computer include a computer incorporated in dedicated hardware and a general-purpose computer capable of executing an arbitrary function through various programs installed therein.

In the computer having the above configuration, for example, the CPU is able to implement a function equivalent to a part or all of hardware configuration of each device described above by loading a program stored in the storage unit onto the RAM via the input/output interface and the bus and executing the program. In other words, at least some of a series of processes described above is performed. The RAM also appropriately stores data and the like necessary for the CPU to execute various kinds of processes.

Figure 5:
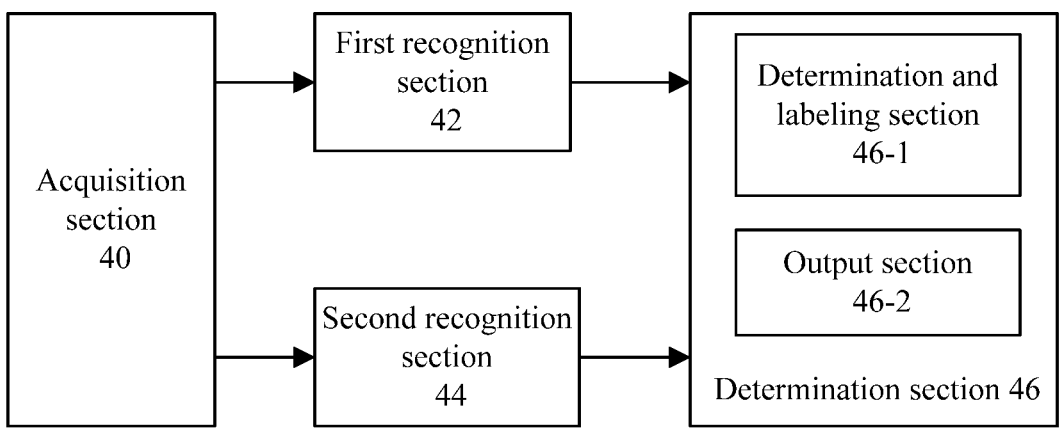
FIG. 5 is a schematic diagram of an optional apparatus for determining feature data of image data according to the first embodiment of the present disclosure.

FIG. 5 is a schematic diagram of an optional apparatus for determining feature data of image data according to the first embodiment of the present disclosure. The apparatus comprises an acquisition section 40, a first recognition section 42, a second recognition section 44 and a determination section 46. Next, each part will be described in detail.

The acquisition section 40, the first recognition section 42, the second recognition section 44 and the determination section 46 may be implemented by the above processor 110, and division or combination thereof are not limited. In addition, a part or all of the functions of these sections may also be realized through a dedicated circuit (for example, an Application Specific Integrated Circuit (ASIC) or a Field-Programmable Gate Array (FPGA)). Moreover, an external device connected with the network may also be responsible for a part of processing.

The acquisition section 40 may be a camera that is configured to acquire image data. The first recognition section 42 is connected to the acquisition section 40. The first recognition section 42 receives the image data acquired by the acquisition section 40 and acquires the first feature of the image data. Specifically, in the first recognition section 42, the first feature is acquired from the image data obtained by the acquisition section 40 through the first model which is trained in a machine learning manner, for example, an artificial intelligence-based model. The second recognition section 44 is connected to the acquisition section 40. The second recognition section 44 receives the image data acquired by the acquisition section 40 and acquires the second feature of the image data. Specifically, in the second recognition section 44, the second feature is acquired from the image data obtained by the acquisition section 40 through the second model that is constructed based on a pre-configured data processing algorithm, for example, an edge detection-based model. The determination section 46 comprises a determination and labeling section 46-1 and an output section 46-2. The determination and labeling section 46-1 is configured to compare the first feature acquired by the first recognition section 42 and the second feature acquired by the second recognition section 44 to determine whether they are the same or not. In addition, the determination and labeling section 46-1 is further configured, in a case where it is determined that the first feature and the second feature are different, to assign the first feature and the second feature with the first label and the second label respectively, and take the first feature and the second feature as the first feature data and the second feature data, respectively, and in a case where it is determined that the first feature and the second feature are the same, to assign the first feature or the second feature with a third label, and take the first feature or the second feature as the third feature data. The output section 46-2 is configured, in a case where the determination and labeling section 46-1 determines that the first feature and the second feature are different, to output the first label and the second label, and output the first feature data and/or the second feature data as the feature data, and in a case where the determination and labeling section 46-1 determines that the first feature and the second feature are the same, to output the third label and output the third feature data as the feature data. Wherein, the output section 46-2 may be a display.

Through the above-mentioned steps, an illustrative purpose of improving the determination result as an output is achieved by combining the AI determination method and the determination method close to human determination results, thereby achieving the technical effect that AI recognized features are more consistent with human recognized features.

It should be noted that, alternatively, the processing performed in the first recognition section 42 and the second recognition section 44 may be executed in parallel or in series. In a case where the processing performed in the first recognition section 42 and the second recognition section 44 is executed in series, the temporal sequence of the two may be arbitrary. In addition, the output section 46-2 in the determination section 46 may be omitted from the above-described apparatus as needed. Wherein, the feature data outputted by the output section 46-2 characterizes a color feature, texture feature, shape feature, or spatial relationship feature of the image data acquired by the acquisition section 40. The color feature, texture feature, shape feature or spatial relationship feature of the image data acquired by the above-mentioned method can be used for damage inspection and disease diagnosis. For example, an endoscopic image is recognized by the above-mentioned method, so that the outputted feature data can be used to detect whether the tested subject has a cancerous condition.

Figure 6:
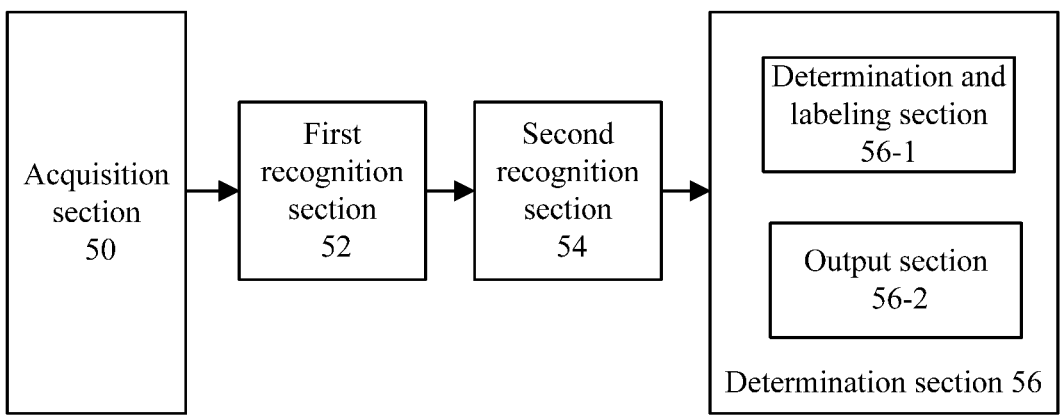
FIG. 6 is a schematic diagram of an optional apparatus for determining feature data of image data according to the second embodiment of the present disclosure.

FIG. 6 is a schematic diagram of an optional apparatus for determining feature data of image data according to the second embodiment of the present disclosure. Parts different from the first embodiment are a first recognition section 52 and a second recognition section 54, and only different parts will be described below.

The first recognition section 52 is connected to the acquisition section 50. The first recognition section 52 receives the image data acquired by the acquisition section 50 and extracts the first feature of the image data. Specifically, in the first recognition section 52, the first feature is extracted from the image data obtained by the acquisition section 50 through the first model which is trained in a machine learning manner, for example, an artificial intelligence-based model. The second recognition section 54 is connected to the first recognition section 52, and the second recognition section 54 extracts the second feature. Specifically, the second feature is extracted from the feature region where the first feature extracted in the first recognition section 52 is located, wherein, the second model is constructed based on a pre-configured data processing algorithm, for example, it is an edge detection-based model.

Figure 7:
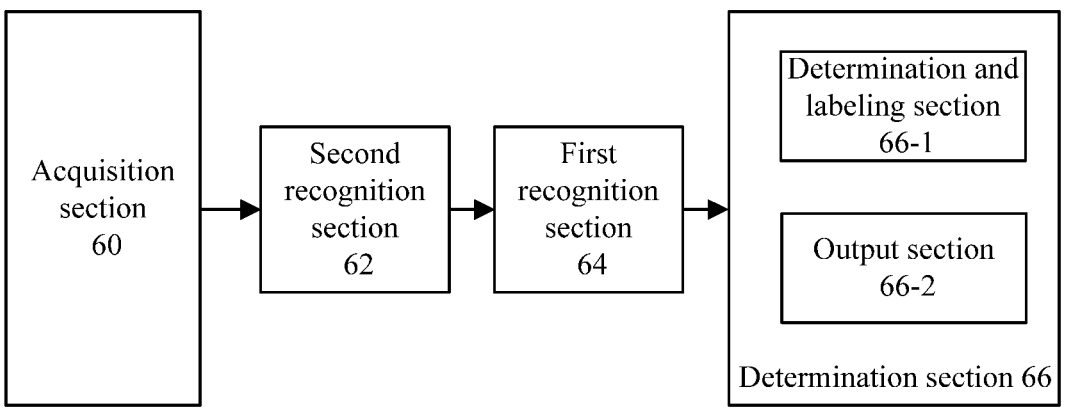
FIG. 7 is a schematic diagram of an optional apparatus for determining feature data of image data according to the third embodiment of the present disclosure.

FIG. 7 is a schematic diagram of an optional apparatus for determining feature data of image data according to the second embodiment of the present disclosure. Parts of the apparatus different from the first embodiment are a second recognition section 62 and a first recognition section 64, and only the different parts are described below.

The second recognition section 62 is connected to the acquisition section 60. The second recognition section 62 receives the image data acquired by the acquisition section 60 and extracts the second feature of the image data. Specifically, in the second recognition section 62, the second feature is extracted from the image data obtained by the acquisition section 60 through the second model which is constructed based on a pre-configured data processing algorithm, for example, an edge detection-based model. The first recognition section 64 is connected to the second recognition section 62, and the first recognition section 64 extracts the first feature. Specifically, the first feature is extracted from the the feature region where the second feature extracted by the second recognition section 62 is located through the first model which is trained in a machine learning manner, for example, an artificial intelligence-based model. The serial numbers of the above-mentioned embodiments of the present disclosure are merely for the purpose of description and do not represent the advantages and disadvantages of the embodiments.

In the foregoing embodiments of the present disclosure, the description of each embodiment has its own emphasis. For the parts that are not described in detail in one embodiment, reference may be made to related descriptions in other embodiments.

In the several embodiments provided in the present application, it should be understood that the disclosed technical content may be implemented in other manners. The apparatus implementation manners described above are merely exemplary. For example, the unit division may be a logic function division and may be other division in actual implementation. For example, a plurality of units or components may be combined or may be integrated into another system, or some features may be ignored or not executed. In addition, the shown or discussed mutual coupling or direct coupling or communication connection may be indirect coupling or communication connection through some interfaces, units or modules, and may be in electrical or other forms.

The units described as separate components may or may not be physically separated. The components displayed as units may or may not be physical units, that is, may be located in one place or may be distributed on multiple units. Some or all of the units may be selected according to actual needs to achieve the objectives of the solutions of the embodiments.

In addition, each of the functional units in the embodiments of the present disclosure may be integrated in one processing unit, or each of the units may separately, or two or more units may be integrated in one unit. The above-mentioned integrated unit can be implemented in the form of hardware or in the form of software functional unit.

If the integrated unit is implemented in the form of a software functional unit and is sold or used as an independent product, the integrated unit may be stored in a computer-readable storage medium. Based on this understanding, the technical solutions of the present disclosure essentially, or the part contributing to the prior art, or all or part of the technical solutions may be implemented in the form of a software product stored in a storage medium, comprising several instructions for causing a computer device (such as a personal computer, a server or a network device) to execute all or part of the steps of the method according to the embodiments of the present disclosure. The foregoing storage medium comprises various media capable of storing program code such as a USB flash drive, a read-only memory (ROM), a random access memory (RAM), a removable hard disk, a magnetic disk, or an optical disk.

The foregoing is only the preferred embodiments of the present disclosure, and it should be noted that those of ordinary skill in the art may make some improvements and modifications without departing from the principle of the disclosure. These improvements and modifications should be regarded to be within the scope of protection of the present disclosure.

The invention claimed is:

1. A method for determining feature data of image data, comprising:
acquiring features of the image data, the features comprising a first feature and a second feature, wherein, the first feature is extracted from the image data using a first model, the first model being trained in a machine learning manner, and the second feature is extracted from the image data using a second model, the second model being constructed based on a pre-configured data processing algorithm; and
determining the feature data based on the first feature and the second feature, comprising:
comparing the first feature and the second feature so as to determine whether the first feature is the same as the second feature;
if the first feature is different from the second feature, assigning the first feature and the second feature with a first label and a second label respectively, and assigning the first feature and the second feature as first feature data and second feature data respectively; and
if the first feature is the same as the second feature, assigning either the first feature or the second feature with a third label, and assigns either the first feature or the second feature as third feature data.

2. The method for determining feature data of image data of claim 1, wherein, the acquiring features of the image data comprises one of:
extracting the first feature from the image data, and extracting the second feature from the feature region where the first feature of the image data is located;
extracting the second feature from the image data, and extracting the first feature from the feature region where the second feature of the image data is located; and
extracting the first feature and the second feature for the entirety of the image data.

3. The method for determining feature data of image data of claim 1, wherein,
the feature data characterizes a luminance feature, a color feature, a texture feature, a shape feature, or a spatial relationship feature of the image data.

4. An apparatus for determining feature data of image data, comprising:
a processor configured to:
acquire features of the image data, the features comprising a first feature and a second feature, wherein, the first feature is extracted from the image data using a first model, the first model being trained in a machine learning manner, and the second feature is extracted from the image data using a second model, the second model being constructed based on a pre-configured data processing algorithm; and
determine the feature data based on the first feature and the second feature, wherein, the processor:
compares the first feature and the second feature so as to determine whether the first feature is the same as the second feature;
if the first feature is different from the second feature, assigns the first feature and the second feature with a first label and a second label respectively, and assigns the first feature and the second feature as first feature data and second feature data respectively; and
if the first feature is the same as the second feature, assigns either the first feature or the second feature with a third label, and assigns either the first feature or the second feature as third feature data.

5. The apparatus for determining feature data of image data of claim 4, wherein, the processor acquires the features of the image data by one of:
extracting the first feature from the image data, and extracting the second feature from the feature region where the first feature of the image data is located;
extracting the second feature from the image data, and extracting the first feature from the feature region where the second feature of the image data is located; and
extracting the first feature and the second feature for the entirety of the image data.

6. The apparatus for determining feature data of image data of claim 4, wherein,
the feature data characterizes a color feature, a texture feature, a shape feature, or a spatial relationship feature of the image data.

7. A system for determining feature data of image data, comprising:
a processor for executing the method of claim 1; and
a display for outputting the feature data.

8. A non-transitory computer readable storage medium having a program stored thereon, which program, when executed, executes the method of claim 1.

9. The method for determining feature data of image data of claim 2, wherein,
the feature data characterizes a luminance feature, a color feature, a texture feature, a shape feature, or a spatial relationship feature of the image data.

10. The apparatus for determining feature data of image data of claim 5, wherein,
the feature data characterizes a color feature, a texture feature, a shape feature, or a spatial relationship feature of the image data.

11. A system for determining feature data of image data, comprising:
a processor for executing the method of claim 2; and
a display for outputting the feature data.

* * * * *